DATA HANDLING SYSTEM AND MAGNETIC SWITCHING NETWORK THEREFOR
Filed Oct. 10, 1955
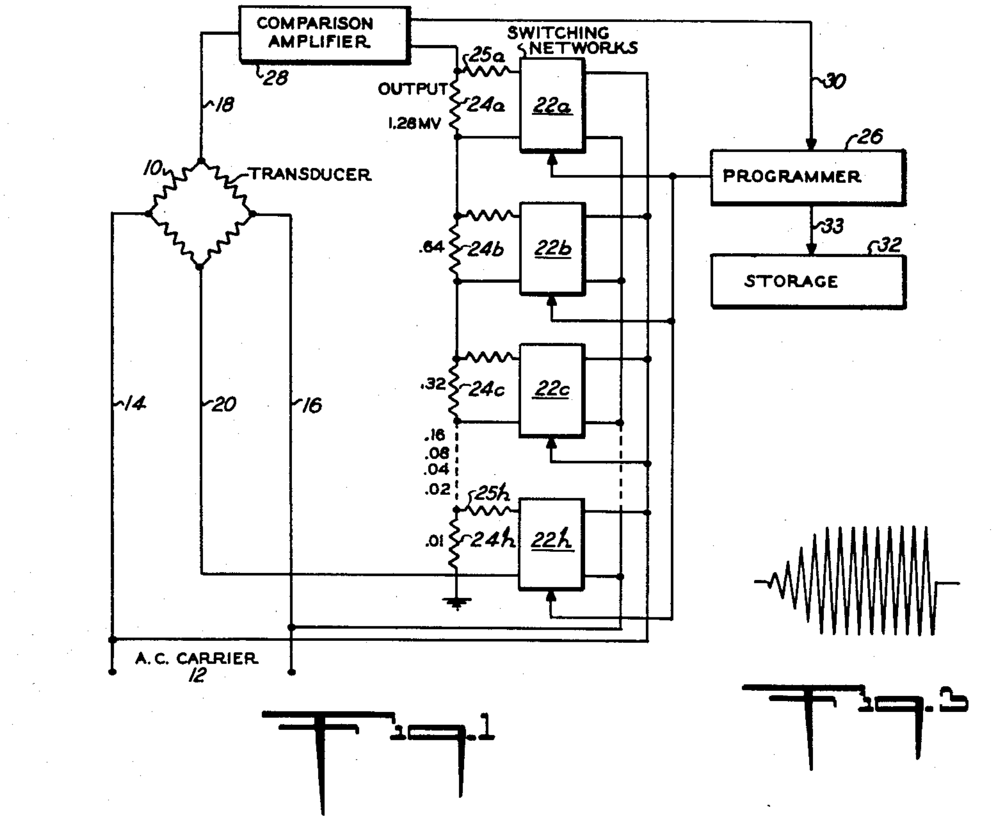
FIG. 1, FIG. 3
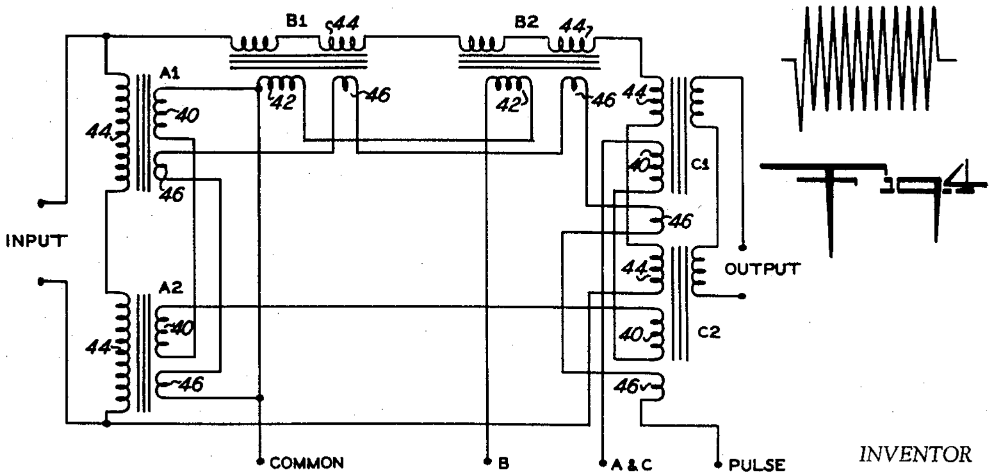
FIG. 4
FIG. 2
INVENTOR
L. PAUL GIESELER
BY Fisher & Christen
ATTORNEY United States Patent Office 2,972,136
Patented Feb. 14, 1961

2,972,136

DATA HANDLING SYSTEM AND MAGNETIC SWITCHING NETWORK THEREFOR

Luther Paul Gieseler, Rockville, Md.
(415 Brook Drive, Falls Church, Va.)

Filed Oct. 10, 1955, Ser. No. 539,404
6 Claims. (Cl. 340—347)

This invention relates to a data measuring and handling system and a magnetic switching network for such a system.

More specifically, this invention relates to a data handling system in which an electrical signal proportional to the output of a transducer, such as a strain gauge, is rapidly measured by an electrical measuring system and converted to a pulse train representing a number in digital form. Storage means is provided for recording the digital information.

The elements of such a system are the transducer, whose condition is to be measured and recorded; an analog to digital converter including a programmer, and a storage device to which the digital information is serially transmitted by the programmer. In the converter, the voltage from the transducer is compared with a sum of voltages in a binary series by means of a comparison amplifier. The binary voltages are impressed on a voltage divider through a series of switching networks and are turned off and on by the switching networks until a balance is achieved between the transducer output and the voltage divider output. (Other digital codes may of course be used instead of the binary code, such as a decimal code.) After the balance is reached, a pulse train representing the binary voltage is sent out by the programmer to storage. A vital element of this system is the switching network, which selectively applies the required voltage, or no voltage, to the voltage divider during the comparison process. If the system is to measure voltages with great accuracy, it is necessary for the output voltage of the switching network at no voltage (open) condition to be considerably smaller than the smallest measurement desired.

Since this is essentially a sampling system, the time required for sampling must be appreciably shorter than the time in which the transducer changes from one condition to another. The speed of the system is determined by how long it takes to make a complete measurement, which in turn is largely dependent upon the speed of operation of the switching network. Although the switching can be done by vacuum tube circuits, increased reliability and ruggedness are obtainable by using saturable magnetic elements.

Saturable reactors have been used for the switching and storage elements due to their reliability, ruggedness, unlimited life and small size. However, saturable reactors have several disadvantages when used as switching elements such as a high ratio of saturated to unsaturated impedance of about 1% instead of .01%, as required for the accuracy discussed above. Further, they have a poor transient response due to the residual magnetism of the core.

It is therefore a primary object of this invention to eliminate the disadvantages of the saturable reactor in such switching devices by providing a magnetic switching network which uses series and shunt inductances combined to achieve a control ratio of 0.01% and which includes a demagnetizing winding operable quickly to demagnetize the saturable reactors and thereby to improve their transient signal response.

This and other objects of the invention will become more readily apparent from the following detailed description of the invention taken in conjunction with the drawings, in which:

Fig. 1 shows a circuit diagram of an analog to digital converter for use in a strain gauge measuring system;

Fig. 2 shows a circuit diagram of a switching network used in the system;

Fig. 3 shows a typical oscilloscope pattern of the response of the switching network without the demagnetizing pulse; and Fig. 4 shows a typical oscilloscope pattern of the response of the switching network with the demagnetizing pulse.

In my report entitled Magnetic Switching Network for Data Handling Systems, NAVORD Report 3824, Aeroballistic Research Report No. 254, U.S. Naval Ordnance Laboratory, White Oak, Maryland, I have disclosed a system and network according to the invention, as well as certain background material.

This invention can best be understood by describing it with respect to a practical application, such as in the sampling of the condition of a strain gage.

For example, in the testing of aircraft structures, it is not unusual to have several hundred strain gages cemented to the structure at various points. These gages are usually wired into a large number of bridge circuits, with a source of alternating current driving the bridges and the output of the bridges containing information about the strain in the structure. Since there are so many channels, it is an obvious economy to switch a number of these output voltages, before amplification, into a single data-processing channel. The switching means should be capable of operating at levels of approximately one millivolt at a frequency of the order of 1000 c.p.s., and should introduce a minimum of amplitude distortion into the signal.

In Fig. 1, a bridge type strain gage 10 of known design is operatively connected to the element whose strain is to be measured. It is to be understood that while the invention is described with reference to a strain gage, the system is applicable to many other types of transducers. An alternating current carrier 12, such as a 1000 cycle sine wave in this case, is applied to the gage through leads 14 and 16 to provide a measure of the strain. A comparison amplifier is used to balance the output from the transducer 10 to a precision voltage divider 24.

The carrier voltage is applied through switching networks 22 (to be described below) to a precision voltage divider 24. The voltage divider consists of a series of output resistors 25*a*–25*h* and voltage dividing resistors 24*a*–24*h*, arranged to provide a series of output voltages of varying magnitude. In this embodiment, the magnitudes range from 1.28 mv. to .01 mv. arranged in a binary series; i.e., each voltage being half the next adjacent voltage, in descending order. A programmer 26 effects the operation of the switching networks 22 in a manner to be described, so that, selectively, certain of the switches 22 permit a voltage to be applied to a segment of the voltage divider.

A comparison amplifier 28 is connected in series in the signal circuit and is adapted to compare the signal from the transducer with the total voltage on the divider 24. The output of the amplifier is connected by leads indicated at 30 to the programmer 26. The amplifier will transmit to the programmer a comparison of the two voltages, that is, that the divider voltage is greater than, or less than, the signal voltage.

More specifically, in the embodiment illustrated, the switch 22*a* is closed to apply a 1.28 mv. source to the corresponding output segment 24*a*.

If the comparison amplifier indicates that this voltage is not as large as the signal, the 0.64 mv. source is also turned on, making a total voltage of 1.92 mv.

If this voltage is still smaller than the signal, the 0.32 mv. source is turned on.

This process is continued until either a maximum of 2.55 mv. is reached, or until the addition of a certain voltage increment produces an output which is larger than the signal. The programmer is designed to turn this network off, and to turn the next lower network on.

It can be seen that after all eight networks have been turned on (and some of them subsequently turned off again) a balance will be achieved between signal and network voltage, within 0.01 millivolt. The digital representation of the signal is then available in binary form by recording which switches 22 are open and which switches 22 are closed.

The binary information is transmitted to the storage means 32 through the leads indicated at 33. Storage means 32 can be magnetic storage or any suitable recording means.

The total time for one measurement as shown by the above procedure is the time necessary to take the reading across one section of the voltage divider 24 times the number of sections. If a large system is to be accommodated, the response of the networks 22 must be fast, with a small spurious transient response.

The programmer 26 is made up of circuitry which produces control pulses for the switching network 22 in response to signals from the comparison amplifier. A standard timing source is used which is normally synchronized with the A.C. carrier 12. Conventional circuitry is used to convert the pulses from the timing source to pulses occurring individually on a plurality of wires, a pulse on any one wire being separated from a pulse on the next wire by a fixed interval of time.

These wires connect to a register of a conventional bi-stable multivibrator through a conventional "gate" circuit which is controlled by the comparison amplifier 28. Two wires from each stage of the register connect to each magnetic switching network. These pulses are the "B" which go to coils 42 and the "A and C" which go to coils 40. In addition a third wire from the timing source connects to all the switching networks for the "demagnetizing pulse." A pulse occurring after all the switching networks have been impulsed causes the information contained in the register to be transferred to storage, and the cycle is repeated.

To provide the desired speed of operation, the switching network 22, shown in detail in Fig. 2, has been designed. It comprises input shunt reactors $A_1$ and $A_2$, series reactors $B_1$ and $B_2$, and output reactors $C_1$ and $C_2$. Reactors A and C may, of course, be used as shunt inductances, matching transformers or auto-transformers, as a particular application may require. Saturation windings 40 are used to apply a D.C. current to magnetically saturate cores A and C. Saturation windings 42 are used to saturate the B cores.

A pair of reactors with equal signal currents and equal windings 44 is used in this application with equal control windings 40 and 42 for the A, B and C cores. The signal currents are then balanced equally with no signal voltage on the control windings 40 and 42, thus any current that flowed in the control winding due to the signal current would act as an undesirable load on the network. The balanced windings isolate the control circuit from the signal circuit.

Broadly, the operation of the switch thus far described is as follows: The signal is passed through the network by saturating the B cores with a current through the saturating winding 42 and removing all currents from the windings 40. The B reactors then exhibit a very small series impedance, and the A and C reactors exhibit a very large shunt impedance. The signal is blocked by reversing the operation with a current through windings 40 on the A and C cores and a removal of the current on the windings 42 of the B cores. The B reactors then show a large series impedance and the A and C reactors show a very small shunt impedance.

One transformer such as the C reactors might have been used in this application if the required attenuation ratio had not been as low as .01%. In my NAVORD report cited above, I have disclosed an analysis of a single transformer and have shown that for high permeability cores the attenuation ratio that can be obtained is about 1%, while .01% is very difficult to achieve.

Fig. 3 shows the response at the output of the C reactors of the switching network without the use of my arrangement for demagnetizing the cores, other than switching off the saturating current. The output rises very slowly and does not achieve a stable operating value for an appreciable time later.

When the saturation current is turned off in the shunt reactors A and C and the saturation current turned on to the series reactor B, the output will rise slowly and reach a stable, correct output an appreciable time later.

It has been found that if a pulse demagnetizing winding 46 is used on all reactors, a stable operating point and fast response from the network is achieved.

A current pulse of the proper amplitude applied to the windings 46 immediately after the saturation current is turned off (preferably within 1 cycle) demagnetizes the cores of the reactors and forces them to assume a stable value and achieve the correct output in a very short time.

This is demonstrated by Fig. 4, which shows the response of the network with the demagnetizing pulse. The demagnetizing pulse materially shortens the time delay needed before the comparison amplifier 28 can compare the voltage across the voltage divider 24 to that of the transducer 10.

The demagnetizing pulse is applied immediately following a change to either open or closed condition, so as to obtain the maximum impedance from the series reactors or shunt reactors respectively.

In the preferred embodiment, demagnetization is effected by applying a D.C. pulse of approximately 1 ms. duration. Alternatively, like results could be obtained by applying to windings 46 a short high frequency pulse of diminishing amplitude. That such a pulse will be effective is demonstrated by Fig. 3, which shows a gradual increase of voltage to the correct output due to the demagnetizing influence of the A.C. carrier 12.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention, as comprehended within the scope of the accompanying claims.

I claim:

1. A data handling system comprising: means for generating a signal voltage proportional to a specified condition; means for producing a reference voltage, said voltage producing means comprising a voltage divider arranged to yield a number of voltages arranged in a binary series, a second voltage dividing resistor connected to each section of the voltage divider, a switching network connected in series with the second voltage dividing resistor and one section of the voltage divider, said switching network composed of saturable reactors with windings arranged in shunt and series, demagnetizing means for each reactor to provide a fast transient response; means connected to the signal means and reference voltage means for comparing the signal voltage to the reference voltage within .01 mv.; and means connected to the switching network and to the comparsion means for adjusting the reference voltage to within .01 mv. of the signal voltage.

2. A data handling system comprising: a source of alternating voltage; a transducer connected to said voltage source; a reference signal voltage divider arranged in a binary series; plurality of switching networks for selectively applying said alternating voltage to the voltage divider; each network having an input and output, a first set of shunt reactors connected to said input, a second set of series reactors connected between said input and output, a third set of shunt reactors connected across said output, means for rapidly closing said switching network including: means for saturating the series reactors, and means for completely demagnetizing the shunt reactors whereby the network passes a signal with a minimum time delay from the time of closing of the network; comparsion means connected between the transducer output and reference signal voltage divider for comparing the transducer voltage to the reference voltage; and means connected to the comparsion means for adjusting the reference signal to approximate the transducer voltage.

3. A data handling system comprising: a source of alternating voltage; a transducer connected to said voltage source responsive to a specified condition; a reference signal voltage divider arranged in a binary series; means connected between said alternating voltage and said voltage divider to apply said alternating voltage to said voltage divider including a switching network; said switching network comprising an input and output, a first set of shunt reactors connected to said input, a second set of series reactors connected between said input and output, a third set of shunt reactors connected across said output; means for rapdily closing said switching network including: means for saturating the series reactors, and means for completely demagnetizing the shunt reactors whereby the network passes a signal with a minimum time delay from the time of closing of the network in which said last named means comprises means producing a current pulse synchronzied to follow immediately the application of said saturating means; comparsion means connected between the transducer output and reference voltage divider for comparing the transducer voltage to the reference voltage; and programming means connected to the comparsion means and to said switching network for turning the networks off and on in a predetermined manner so that the output of the reference voltage divider will substantially equal the transducer output.

4. A data handling system comprising a source of alternating voltage; a transducer connected to said alternating voltage source having an output proportional to a specified condition; a voltage divider for providing a reference source of output voltage arranged in a binary series across a series of resistors; means connected between said alternating voltage and said reference source for applying said alternating voltage to said voltage divider to provide said reference voltage; said last named means including, for each section of the series of resistors, another voltage dividing resistor; and a switching network having an input and output, a first set of shunt reactors connected to said input, a second set of series reactors connected between said input and output, a third set of shunt reactors connected across said output, means for rapidly closing said switching network including: means for saturating the series reactors, and means for completely demagnetizing the shunt reactors whereby the network passes a signal with a minimum time delay from the time of closing of the network in which said last named means comprises means producing a current pulse synchronized to follow immediately the application of said saturating means; comparsion means connected between the transducer output and reference source for comparing the transducer output to the reference source; and programming means connected to the comparison means and to said switching networks for turning the networks off and on in a predetermined manner so that the output of the reference voltage divider will substantially equal the transducer output.

5. A switching network comprising an input and output, a plurality of saturable reactors connected between said input and output, said reactors including sets of series and shunt reactors connected between said input and output, means cooperating with said reactors for selectively magnetically saturating one set of said reactors, a demagnetizing winding connected to each of said reactors, and means connected to said demagnetizing windings for applying a signal to substantially completely demagnetize the remaining set of reactors.

6. A switching network comprising an input and output, saturable transformers connected across said input and output, saturable reactors connected in series between said transformers, said transformers and reactors comprising two similar cores with the control windings connected in opposition, a separate winding on each transformer and reactor for applying a signal to demagnetize the unsaturated cores to shorten the transient response of the network.

References Cited in the file of this patent

UNITED STATES PATENTS

| | | |
|---|---|---|
| 2,139,232 | Hysko | Dec. 6, 1938 |
| 2,497,961 | Shaw | Feb. 21, 1950 |
| 2,644,129 | Ramey | June 30, 1953 |
| 2,682,615 | Sziklai | June 29, 1954 |
| 2,691,073 | Lowman | Oct. 5, 1954 |
| 2,717,994 | Dickinson | Sept. 13, 1955 |
| 2,723,355 | Graham | Nov. 8, 1955 |
| 2,754,503 | Forbes | July 10, 1956 |
| 2,767,330 | Marshall | Oct. 16, 1956 |
| 2,784,396 | Kaiser | Mar. 5, 1957 |
| 2,790,159 | Barker | Apr. 23, 1957 |
| 2,809,303 | Collins | Oct. 8, 1957 |
| 2,918,664 | Bauer | Dec. 22, 1959 |